United States Patent
Pearl, Jr. et al.

(10) Patent No.: US 10,907,084 B2
(45) Date of Patent: Feb. 2, 2021

(54) NANOFIBRIL CELLULOSE ADDITIVE

(71) Applicant: Halliburton Energy Services, Inc., Houston, TX (US)

(72) Inventors: William Cecil Pearl, Jr., Spring, TX (US); Samuel J. Lewis, Spring, TX (US); Thomas Singh Sodhi, New Caney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 159 days.

(21) Appl. No.: 16/062,587

(22) PCT Filed: Feb. 23, 2016

(86) PCT No.: PCT/US2016/019162
§ 371 (c)(1),
(2) Date: Jun. 14, 2018

(87) PCT Pub. No.: WO2017/146687
PCT Pub. Date: Aug. 31, 2017

(65) Prior Publication Data
US 2019/0048248 A1    Feb. 14, 2019

(51) Int. Cl.
*C09K 8/467* (2006.01)
*C09K 8/514* (2006.01)
(Continued)

(52) U.S. Cl.
CPC ............ *C09K 8/467* (2013.01); *C04B 20/006* (2013.01); *C04B 20/1022* (2013.01);
(Continued)

(58) Field of Classification Search
CPC .......... C09K 8/467; C09K 8/035; C09K 8/04; C09K 8/514; C09K 8/90; C09K 2208/08
See application file for complete search history.

(56) References Cited

U.S. PATENT DOCUMENTS 6,063,738 A    5/2000    Chatterji et al.
6,348,436 B1   2/2002    Langlois et al.
(Continued)

FOREIGN PATENT DOCUMENTS

EP    2884000    6/2015
FR    2794762    12/2000
(Continued)

OTHER PUBLICATIONS

"Nanofbrillated Cellulose Surface Modification: A Review" Missoum et al. dated May 2, 2013.
(Continued)

*Primary Examiner* — Aiqun Li
(74) *Attorney, Agent, or Firm* — Thomas Rooney; C. Tumey Law Group PLLC

(57) ABSTRACT

A variety of systems, methods and compositions are disclosed, including, in one method, a method for well treatment may comprise providing a treatment fluid comprising an aqueous base fluid; and a nanofribril cellulose additive, wherein the nanofribril cellulose additive comprises nanofribril cellulose and a surfactant adsorbed onto a surface of the nanofribril cellulose; and introducing the treatment fluid into a well bore penetrating a subterranean formation. Additional systems, methods and compositions are also disclosed.

17 Claims, 2 Drawing Sheets

(51) Int. Cl.
- *C09K 8/90* (2006.01)
- *C08L 1/02* (2006.01)
- *C09K 8/04* (2006.01)
- *C04B 28/02* (2006.01)
- *C09K 8/035* (2006.01)
- *D21H 11/16* (2006.01)
- *C04B 20/10* (2006.01)
- *C04B 20/00* (2006.01)
- *D21H 11/18* (2006.01)

(52) U.S. Cl.
CPC ............. *C04B 28/02* (2013.01); *C08L 1/02* (2013.01); *C09K 8/035* (2013.01); *C09K 8/04* (2013.01); *C09K 8/514* (2013.01); *C09K 8/90* (2013.01); *D21H 11/16* (2013.01); *D21H 11/18* (2013.01); *C09K 2208/08* (2013.01); *Y02W 30/91* (2015.05)

(56) References Cited

U.S. PATENT DOCUMENTS

| | | |
|---|---|---|
| 6,967,027 B1 | 11/2005 | Heux et al. |
| 2002/0170468 A1 | 11/2002 | Luo et al. |
| 2005/0256262 A1 | 11/2005 | Hill et al. |
| 2007/0123434 A1 | 5/2007 | Lewis et al. |
| 2010/0282126 A1 | 11/2010 | Nevin |
| 2012/0227633 A1 | 9/2012 | Laukkanen et al. |
| 2013/0274149 A1* | 10/2013 | Lafitte ................ C09K 8/035 507/112 |
| 2014/0020895 A1 | 1/2014 | Agapiou et al. |

FOREIGN PATENT DOCUMENTS

| | | |
|---|---|---|
| KR | 101570001 | 11/2015 |
| WO | 2014044870 | 3/2014 |
| WO | 2017138913 | 11/2016 |
| WO | 2016187362 | 8/2017 |

OTHER PUBLICATIONS

"Reduction of water wettability of nanofibrillated cellulose by adsorption of cationic surfactants" Xhanari et al.

International Search Report and Written Opinion for PCT/US2016/019162 dated Oct. 31, 2016.

Australian Examination Report 2 for Application No. 2016393808, dated Aug. 17, 2020.

Cervin, Nicholas T. et al., "Lightweight and Strong Cellulose Materials Made From Aqueous Foams Stabilized by Nanofibrillated Cellulose", Biomacromolecules, (2013), vol. 14, pp. 503-511, doi: 10.1021/bm301755u.

Australian Examination Report 3 for Application No. 2016393808, dated Oct. 2, 2020.

* cited by examiner

NANOFIBRIL CELLULOSE ADDITIVE

BACKGROUND

Nanofribril cellulose ("NFC") is a highly desirable additive with applications in many industries such as construction, manufacturing, pharmaceuticals, and the food industry. NFC is renewable, lightweight, and contains high structural strength, making it ideally suited for material strength enhancement. The industrial process to produce NFC is a water based process that typically yields water based solutions with low NFC weight percentages. Concentrating the NFC may initially result in NFC with higher weight percentages, and eventually results in a paper-like solid. The paper-like solid may be an efficient method of transporting the NFC, but may require an end user to further process the paper-like solid for extended periods of time, or mix the paper-like solid at very large shear rates in order to disperse the NFC. Therefore, techniques for preparing an easily dispersible, concentrated form of NFC are desired.

BRIEF DESCRIPTION OF THE DRAWINGS

These drawings illustrate certain aspects of some of the systems, methods and cement compositions of the present disclosure, and should not be used to limit or define the method.

DETAILED DESCRIPTION

Figure 1:
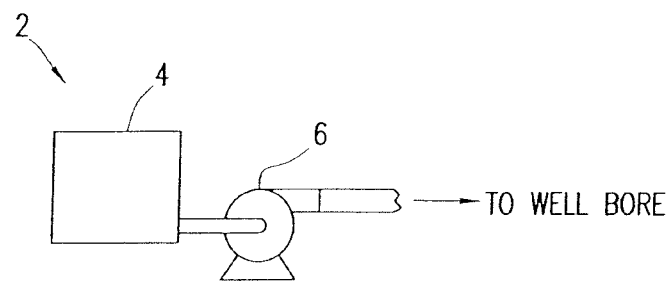
FIG. 1 is a schematic diagram that illustrates a system for preparation and delivery of a cement composition to a wellbore in accordance with certain examples.

Systems, compositions, and methods are directed to preparing a dispersible concentrated nanofribril cellulose ("NFC") additive and, in certain systems, compositions, and methods, to treatment fluids comprising NFC additives, and methods of utilizing NFC in subterranean applications. There may be several potential advantages to the systems, methods and compositions of the present disclosure, only some of which may be alluded to herein. One of the many potential advantages of the systems, methods and compositions of the present disclosure is the biodegradability of NFC. Another potential advantage of the systems, methods and compositions of the present disclosure is the high strength and stiffness of NFC. In addition, the NFC additive may be a concentrated form of NFC that is easily dispersible, thus allowing for ease of transport and use, as compared to NFC additives that may have been used previously.

The NFC additive may comprise NFC and a surfactant, wherein the NFC has been surface treated with the surfactant adsorbed onto a surface of the NFC. The term "nanofribril cellulose" or "NFC" generally refers to cellulose comprising nanofribrils, whether isolated nanofribrils or bundles of nanofribrils, derived from a cellulose raw material. The NFC may be provided as an aqueous dispersion or suspension of the NFC. The aqueous dispersion may be gelatinous in nature.

NFC may be described as long and flexible cellulose nanofribrils and may be obtained from cellulose fiber by mechanical disintegration, for example. Dimensions for NFC may include nanofribrils with a high aspect ratio. The NFC may include individual nanofribrils having lengths from about 35 nm to about 3000 nm or even longer. The NFC may include individual nanofribrils having diameters of about 1000 nm or less, about 500 nm or less, about 100 nm or less, or about 20 nm or less. By way of example, the NFC may include individual nanofribrils having lengths of about 3000 nm or greater and diameters of about 100 nm or less.

NFC may be manufactured from a number of different cellulosic sources. The cellulosic fibers of NFC may be derived from wood, bleached kraft pulp, bleached sulfite pulp, bacteria, sugar beet pulp, wheat straw, soy hulls, sisal, bagasse, palm trees, ramie, carrots, luffa cylindrical, or any combination thereof. A variety of mechanical defibrillation methods may be used, including high-pressure homogenization, grinding, ultrasonication, cryocrushing and high-speed blending.

NFC may display a high surface area, generally of the order of 50-70 $m^2/g$ which may increase the quantity of surface hydroxyl groups available for surfactant adsorption. As previously described, the NFC may be surface treated with the surfactant. The NFC may be provided in a concentrated gel of up to and including 10% by weight. Other concentrations may include, for example, about 0.01% to about 2%, about 2% to about 5%, about 5% to about 7%, or about 7% to about 10%.

The surfactant used in treatment of the NFC may be zwitterionic, cationic, anionic, or amphoteric in nature, and comprise any number of different compounds, including methyl ester sulfonates, betaines, modified betaines, sulfosuccinates, taurates, amine oxides, ethoxylated fatty amines, quaternary ammonium compounds, alcohol ether sulfates, alkyl sulfates, aryl sulfonates, alkyl sulfonates, derivatives thereof, and combinations thereof. The term "derivative" is defined herein to include any compound that is made from one of the listed compounds, for example, by replacing one atom in one of the listed compounds with another atom or group of atoms, ionizing one of the listed compounds, or creating a salt of one of the listed compounds. Without limitation, a suitable surfactant may be classified as a foaming surfactant that can facilitate the formation of a foam, for example, by reducing the surface tension of the water. Foaming surfactants may be beneficial, for example, as the NFC additive may be considered as a foaming agent, as the foaming surfactant adsorbed onto its surface may be cable of facilitating the formation of a foam, such as in a treatment fluid.

Without limitation, the surfactant may include a foaming surfactant that is an anionic, nonionic, amphoteric (including zwitterionic surfactants), or cationic surfactant, or mixtures thereof. Examples of suitable foaming surfactants may include, but are not limited to: betaines; anionic surfactants such as hydrolyzed keratin; amine oxides such as a alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; $C_8$ to $C_{22}$ alkylethoxylate sulfates; and combinations thereof. Specific examples of suitable foaming surfactants include mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable foaming surfactants are ZONESEALANT™ 2000 Agent foamer/stabilizer and Foamer 1026™ foamer/stabilizer, both available from Halliburton Energy Services Inc., Houston, Tex. Additional examples may include Stabilizer 434 A stabilizer, Stabilizer 434 B stabilizer, Stabilizer 434 C stabilizer, Stabilizer 434 D stabilizer, Foamer 760 foamer/stabilizer, Foamer 760 NS foamer/stabilizer, ZONESEALANT™ 3000 foamer/stabilizer and ZONESEALANT™ 4000 foamer/stabilizer. ZONESEALANT™ 2000 Agent foamer/stabilizer may be a blend of anionic and amphoteric surfactants.

NFC may be pre-treated or surface modified with pretreatments, such as, but not limited to, TEMPO mediated oxidation or carboxy-methylation, however, the unmodified NFC may be directly mixed with a surfactant. The surfactant may be adsorbed onto the NFC, which may be unmodified, for example. An aqueous composition of the NFC may be mixed with a surfactant in a weight ratio of about 1:5 (1 part NFC to 5 parts surfactant). Other ratios may include about 2:1, about 4:3, about 1:1, about 1:2, about 1:3, about 1:4, about 1:6, about 1:7, about 1:8, about 1:9, about 1:10, about 1:11, or about 1:12. However, it should be understood that ratios of the NFC to the surfactant outside these ranges may also be used in particular applications. Additional water may also be mixed with the NFC and surfactant. The ratios of NFC to water may include about 1:2 to about 1:100, about 1:5 to about 1:75, or about 1:10 to about 1:50. However, it should be understood that water ratios outside these ranges may also be used in particular applications. The NFC may be mixed with a surfactant and/or water by methods including stirring, shaking, and agitation. The NFC may be mixed with the water and/or surfactant for about 20 minutes. Other mixing times may include about 10 minutes, about 15 minutes, about 25 minutes, about 30 minutes, about 45 minutes or about 60 minutes. However, it should be understood that mixing times outside these ranges may also be used in particular applications.

The contact of the NFC with water and/or surfactant may occur at any suitable temperature. For example, the contact with water and/or surfactant may occur at room temperature or elevated temperatures. Without limitation, the contact may occur at a temperature ranging from about 20° C. to about 100° C. and, alternatively, from about 40° C. to about 90° C., such as at about 40° C., about 50° C., about 60° C., about 70° C., about 80° C., or about 90° C. One of ordinary skill in the art, with the benefit of this disclosure, should be able to select an appropriate time period and temperature for the contact with the water and/or surfactant. After the contact with the water and/or surfactant, the NFC may be filtered and then dried, for example, to substantially remove the water and provide an NFC additive in a dry, solid form. Without limitation, the drying may remove about 90%, about 95%, about 99%, or more of the water by weight. The mixture of the NFC, surfactant, and/or water may be dried at a temperature of about 200° F. Drying temperatures also may include, for example, about 100° F., about 125° F., about 150° F., about 175° F., about 225° F., about 250° F., about 275° F., about 300° F., about 325° F., or about 350° F. Drying times may include about 8 hours, about 12 hours, about 24 hours, about 36 hours, or about 48 hours. However, it should be understood that drying times and temperatures outside these ranges may also be used in particular applications. Agglomerates of the NFC and surfactant formed after drying may then be chopped, cut, or otherwise separated into particulate form. By adsorption of the surfactant on its surface, the NFC may then be dispersed in water without any high shear or sonication. Otherwise, the NFC may need high shear and/or sonication for dispersion in water after it has been dried.

The NFC additive may be used in particulate form. As used herein, the term "particular" refers to materials in solid state having a well-defined physical shape as well as those with irregular geometries, including any particulates elastomers having the physical shape of platelets, shavings, fibers, flakes, ribbons, rods, strips, spheroids, hollow beads, toroids, pellets, tablets, or any other physical shape. Without limitation, the NFC additive may have a particle size in the range of about 5 microns to about 1,500 microns and, alternatively, from about 20 microns to about 500 microns. However, particle sizes outside these defined ranges also may be suitable for particular applications. Particle sizes may be measured using a laser light scattering particle size analyzer from the Malvern Company.

Optionally, a liquid NFC additive may be prepared that may comprise the NFC additive and water. By way of example, the NFC additive may be prepared by combining the NFC with a surfactant and/or water and then drying the mixture of the NFC, surfactant and/or water to provide the NFC additive in solid form. This NFC additive in solid form may then be combined with water to form the liquid NFC additive.

The NFC additive may be utilized in any useful variety of subterranean treatments, including, but not limited to, drilling operations, fracturing treatments, cementing operations, wellbore cleanups and sand control treatment. Without limitation, the NFC additive may be included in a foamed treatment fluid. By way of example, the NFC additive may be used as a foaming additive to foam a treatment fluid with a gas. An example method of treating a subterranean formation may include providing a treatment fluid that comprises an aqueous-base fluid and an NFC additive and introducing the foamed treatment fluid into a wellbore that penetrates the subterranean formation. Without limitation, the treatment fluid may be a cement composition, spacer fluid, drilling fluid, fracturing fluid, or other treatment fluid that may be used in well treatment. By way of example, the NFC additive may be included in a spacer fluid placed between two fluids contained in or to be pumped within a wellbore. Examples of fluids between which spacer fluids are utilized include between cement compositions, and drilling fluids, between different drilling fluids during drilling fluid change outs, and between drilling fluids and completion brines. Among other things, spacer fluids may be used to enhance drilling fluid and filter cake removal from the walls of wellbores, to enhance displacement efficiency and to physically separate chemically incompatible fluids. For example, a cement composition and a drilling fluid may be separated by a spacer fluid when the cement composition is placed in the wellbore. In accordance with systems and methods of the present disclosure, the spacer fluid may prevent, or at least partially reduce intermixing of the cement composition and the drilling fluid, and may facilitate the removal of filter cake and gelled drilling fluid from the walls of the wellbore during displacement of the drilling fluid by the cement composition. By way of further example, the NFC additive may be included in a drilling fluid, wherein the drilling fluid may be circulated past a drill bit used to enlarge a wellbore. The NFC additive may be included in a fracturing fluid introduced into a subterranean formation above a fracture pressure.

Suitable aqueous base fluids may include, but are not limited to, freshwater, seawater, saltwater (e.g., saturated or unsaturated), and brines (e.g., saturated saltwater). The aqueous base fluid may be from any source, provided that it does not adversely affect the stability of the treatment fluids after foaming.

The appropriate amount of the NFC additive to include in the treatment fluid may vary depending upon a number of factors, including the particular application. Without limitation, the NFC additive may be present in the treatment fluids in an amount in the range of from about 0.01% to about 10% by weight. For example, the NFC additive may be included in an amount of about 0.01% to about 2%, about 2% to about 5%, about 5% to about 7%, or about 7% to about 10%. One of ordinary skill in the art, with the benefit of this disclosure, should be able to select an appropriate amount of the NFC additive to use for a particular application. Any suitable technique may be used for preparing the treatment fluid. Without limitation, the NFC additive may be used as a solid additive and dry blended with other solid additives (e.g., cement) used in the treatment fluid prior to combination with the aqueous base fluid. Alternatively, the NFC additive may be used as a rehydrated liquid additive and added directly to the base fluid combined with the aqueous base fluid.

As will be recognized by those of ordinary skill in the art, with the benefit of this disclosure, a wide variety of additional additives may be included in the treatment fluids of the present disclosure. Examples of suitable additives include, but are not limited to, gelling agents, gel breakers, proppant particulates, gravel particulates, defoaming agents, clay stabilizers, scale inhibitors, fluid loss control additives, and combinations thereof.

As stated above, the NFC additive may be used in treatment fluids, such as, for example, cement compositions, which may be foamed or unfoamed. Cement compositions may comprise a cement, an NFC additive and aqueous base fluid. Any of a variety of cements suitable for use in subterranean cementing operations may be used in accordance with systems, methods and compositions of the present disclosure. Suitable examples include hydraulic cements that comprise calcium, aluminum, silicon, oxygen and/or sulfur, which set and harden by reaction with water. Such hydraulic cements, include, but are not limited to, Portland cements, pozzolan cements, gypsum cements, high-alumina-content cements, slag cements, silica cements and combinations thereof. In certain systems, methods and compositions, the hydraulic cement may comprise a Portland cement. Portland cements that may be suited for use in systems, methods and cement compositions of the present disclosure may be classified as Class A, C, H and G cements according to American Petroleum Institute, *API Specification for Materials and Testing for Well Cements*, API Specification 10, Fifth Ed., Jul. 1, 1990. In addition, in some systems, methods and compositions, hydraulic cements suitable for use in the present disclosure may be classified as ASTM Type I, II, or III.

The NFC additive may be included in the cement compositions in an amount desirable for a particular application Without limitation, the NFC additive may be present in the cement compositions in an amount in the range from about 0.1% to about 10% by weight of the cement on a dry basis ("bwoc"), for example, about 0.01% to about 2%, about 2% to about 5%, about 5% to about 7%, or about 7% to about 10%.

Where foamed, the cement compositions may further comprise a gas. Without limitation, the NFC additive may be used to foam the cement composition with the gas, for example, where the surfactant adsorbed on the NFC may be the foaming surfactant. One or more additional foaming surfactants may also be included in the cement compositions in addition to the surfactant adsorbed onto the NFC additive. Those of ordinary skill in the art will appreciate that the cement compositions generally should have a density suitable for a particular application. Where foamed, the foamed cement compositions may have a density in the range of from about 4 pounds per gallon ("lb/gal") to about 13 lb/gal, alternatively, about 9 lb/gal to about 13 lb/gal, or alternatively, about 7 lb/gal to about 9 lb/gal. In addition to be being foamed, the cement compositions may comprise other means to reduce their densities, such as, for example, hollow microspheres, low-density elastic beads, or other density-reducing additives known in the art. Those of ordinary skill in the art, with the benefit of this disclosure, will recognize the appropriate density for a particular application.

Without limitation, the stabilizing ability of the NFC with an unstable foam cement composition formulation may result in stable foamed cement composition designs. The NFC addition to foamed cement compositions may stabilize the foam, and may also make the foam more resistant to destabilizing additives unlike other common stabilizing agents.

The foamed cement compositions may be foamed within a foam quality range of between about 5% to about 80% and, more particularly, from about 18% to about 38%. As used herein, the term "foam quality" refers to the volume of entrained gas and is defined by the following formula: Foam Quality=(Total Foam Volume−Liquid Volume)/Total Foam Volume. Generally, the additional foaming surfactant (where used) may be present in an amount sufficient to provide a suitable foam. Without limitation, the additional foaming surfactant may be present in an amount in the range of from about 0.5% to about 5% by volume of the water ("bvow").

The NFC additive may be dispersed throughout the foamed cement composition. NFC has been shown to stabilize aqueous foams which may then be dehydrated to form very porous lightweight materials. Without limitation, the NFC may stabilize the outside of a bubble or a bubble wall of the foam. The NFC additive may also be resistant to contamination, as well as, destabilization mechanisms, such as liquid drainage and gravity drainage. The NFC additive may provide physical support for the foam, utilizing a "scaffold" approach, unlike other stabilizing agents. This may allow the NFC additive to further resist the destabilizing effects of certain additives.

The foamed cement compositions may be foamed at the well site. By way of example, the foamed cement compositions may be foamed immediately prior to use. The foamed cement compositions may be foamed with a foaming surfactant (e.g., a foaming surfactant adsorbed onto the NFC and/or an additional foaming surfactant) and by entraining gas into the cement compositions. The foamed cement compositions may be foamed, for example, to provide a cement composition with a reduced density.

The gas used for foaming the cement compositions may be any suitable gas for foaming, including, but not limited to: air, nitrogen, and combinations thereof. Generally, the gas should be in an amount sufficient to form the desired foam. Foaming additives may be included to facilitate foaming and/or stabilize the resultant foam formed therewith.

The cement compositions may set to have a desirable compressive strength. Compressive strength is generally the capacity of a material or structure to withstand axially directed pushing forces. The compressive strength may be measured at a specified time after preparation of the cement compositions while the cement composition is maintained under specified temperature and pressure conditions. Compressive strength can be measured by either destructive or non-destructive methods. The destructive method physically tests the strength of cement composition samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the cement compositions may develop a 24-hour compressive strength in the range of from about 50 psi to about 5000 psi, alternatively, from about 100 psi to about 4500 psi, or alternatively from about 500 psi to about 4000 psi. Without limitation, the cement compositions may develop a compressive strength in 24 hours of at least about 50 psi, at least about 100 psi, at least about 500 psi, or more. The compressive strength values may be determined using destructive or non-destructive methods at any temperature, however compressive strength development at temperatures above 400° F. may be of particular importance for potential use in subterranean formations having relatively high bottom hole static temperatures.

In some examples, the cement compositions may have desirable thickening times. Thickening time typically refers to the time a fluid, such as the cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the cement composition to reach 70 Bc and may be reported as the time to reach 70 Bc. The cement compositions may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range from about 50° F. to about 500° F., alternatively, in a range from about 250° F. to about 500° F., and alternatively at a temperature greater than about 400° F.

Other additives suitable for use in subterranean treatment operations also may be added to the cement compositions as desired by those of ordinary skill in the art. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, thixotropic additives, and combinations thereof. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

Weighting agents are typically materials that weigh more than water and may be used to increase the density of the cement composition. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the cement compositions to, for example, decrease the density of the cement compositions. Examples of suitable lightweight additives include, but are not limited to, bentonite, coal, gilsonite, hollow microspheres, low-density elastic beads, nitrogen, pozzolan-bentonite, sodium silicate, combinations thereof, or other lightweight additives known in the art.

Gas-generating additives may be included in the cement composition to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Mechanical-property-enhancing additives may be included in the cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in the cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Thixotropic additives may be included in the cement composition to, for example, provide a cement composition that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The aqueous base fluid used in the cement compositions of the present disclosure may be fresh water or salt water. As used herein, the term "salt water" refers to unsaturated salt water and saturated salt water, including brines and seawater. Generally, the water may be from any source, provided that it should not contain an excess of compounds that may undesirably affect other components in the cement compositions. Further, the water may be present in an amount sufficient to form a pumpable slurry. The cement composition may be a suspension with the solid components of the cement composition suspended in the aqueous base fluid. In certain cement compositions, the water may be present in the cement compositions in an amount in the range from about 33% to about 200% bwoc. For example, the water may be present in the cement compositions in the range from about 35% to about 70% bwoc. One of ordinary skill in the art with the benefit of this disclosure will recognize the appropriate amount of water for a chosen application.

In accordance with the systems, methods and compositions of the present disclosure, a cement composition may be introduced into a selected location and allowed to set therein. As will be appreciated, the selected location may be any suitable location above ground or in a subterranean formation where it is desired for the cement composition to set into a hardened mass. For example, the selected location may be an annulus between a pipe string located in a subterranean formation and the subterranean formation. As described above, a cement composition may comprise a cement, an NFC additive, and water.

As will be appreciated by those of ordinary skill in the art, the systems, methods and compositions of the present disclosure, may be used in a variety of subterranean applications, including primary and remedial cementing. The cement composition may be introduced into a wellbore and allowed to set. The cement composition may comprise cement, an NFC additive, and water. Where foamed, the cement composition may further comprise a gas. By way of example, in example primary cementing applications, the cement composition may be introduced into an annular space between a subterranean formation and a pipe string (or between a pipe string and a large pipe string) located in the subterranean formation. The cement composition may be allowed to set to form a hardened mass in the annular space. In addition, in example remedial cementing applications, a cement composition may be used, for example, in squeeze cementing operations or in the placement of cement plugs.

A method for well treatment may comprise providing a treatment fluid comprising an aqueous base fluid; and a nanofribril cellulose additive, wherein the nanofribril cellulose additive comprises nanofribril cellulose and a surfactant adsorbed onto a surface of the nanofribril cellulose; and introducing the treatment fluid into a well bore penetrating a subterranean formation. The treatment fluid may be a cement composition, a spacer fluid, a drilling fluid, or a fracturing fluid. The treatment fluid may be a cement composition further comprising a hydraulic cement. The nanofribril cellulose may comprise nanofribril cellulose derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrical, and any combination thereof. The nanofribril cellulose may be an unmodified nanofribril cellulose that was treated with the surfactant. The nanofribril cellulose additive may be present in the treatment fluid in an amount of about 0.1% to about 10% by weight of the treatment fluid. The nanofribril cellulose may comprise individual nanofribrils with a diameter of about 100 nanometers or less and a length of about 3000 nanometers or greater. The surfactant may be a foaming surfactant selected from the group consisting of betaines, hydrolyzed keratin, amine oxides, cocoamidopropyl dimethylamine oxide, methyl ester sulfonates; alkyl or alkene amidobetaines, alpha-olefin sulfonates, quaternary surfactants, $C_8$ to $C_{22}$ alkylethoxylate sulfates, and combinations thereof. The surfactant may be a foaming surfactant comprising a mixture of an ethoxylated alcohol ether sulfate surfactant, an alkyl or alkene amidopropyl betaine surfactant, and an alkyl or alkene dimethylamine oxide surfactant. The method may comprise foaming the treatment fluid with a gas, wherein the surfactant is a foaming surfactant.

Another method may comprise preparing a nanofribril cellulose additive comprising providing unmodified nanofribril cellulose; mixing the unmodified nanofribril cellulose with a surfactant in water to form a mixture; and drying the mixture of the unmodified nanofribril cellulose, the surfactant, and the water to substantially remove the water. The surfactant may be a foaming surfactant selected from the group consisting of betaines, hydrolyzed keratin, amine oxides, cocoamidopropyl dimethylamine oxide, methyl ester sulfonates; alkyl or alkene amidobetaines, alpha-olefin sulfonates, quaternary surfactants, $C_8$ to $C_{22}$ alkylethoxylate sulfates, and combinations thereof, and wherein the unmodified nanofribril cellulose comprises nanofribril cellulose derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrical, and any combination thereof. The surfactant may be a foaming surfactant comprising a mixture of an ethoxylated alcohol ether sulfate surfactant, an alkyl or alkene amidopropyl betaine surfactant, and an alkyl or alkene dimethylamine oxide surfactant. The unmodified nanofribril cellulose and the surfactant may be mixed in a weight ratio of the nanofribril cellulose to the surfactant of about 2:1 to about 1:12. The mixture may be dried at a temperature of about 100° F. or greater. The method may further comprise separating an agglomerate of the nanofribril cellulose and the surfactant resulting from the step of drying to form the nanofribril cellulose additive in a particulate form. The nanofribril cellulose may comprise individual nanofribrils with a diameter of about 100 nanometers or less and a length of about 3000 nanometers or greater.

A treatment fluid may comprise an aqueous base fluid; and a nanofribril cellulose additive, wherein the nanofribril cellulose additive comprises nanofribril cellulose and a surfactant adsorbed onto a surface of the nanofribril cellulose. The treatment fluid may be a cement composition, a spacer fluid, a drilling fluid, or a fracturing fluid. The treatment fluid may be a cement composition further comprising a hydraulic cement. The nanofribril cellulose may be an unmodified nanofribril cellulose that was treated with the surfactant. The treatment fluid may be a foamed treatment fluid further comprising a gas, wherein the surfactant is a foaming surfactant. The nanofribril cellulose may comprise nanofribril cellulose derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrical, and any combination thereof. The nanofribril cellulose additive may be present in the treatment fluid in an amount of about 0.1% to about 10% by weight of the treatment fluid. The nanofribril cellulose may comprise individual nanofribrils with a diameter of about 100 nanometers or less and a length of about 3000 nanometers or greater. The surfactant may be a foaming surfactant selected from the group consisting of betaines, hydrolyzed keratin, amine oxides, cocoamidopropyl dimethylamine oxide, methyl ester sulfonates; alkyl or alkene amidobetaines, alpha-olefin sulfonates, quaternary surfactants, $C_8$ to $C_{22}$ alkylethoxylate sulfates, and combinations thereof. The surfactant may be a foaming surfactant comprising a mixture of an ethoxylated alcohol ether sulfate surfactant, an alkyl or alkene amidopropyl betaine surfactant, and an alkyl or alkene dimethylamine oxide surfactant.

A system may include a well system comprising a treatment fluid comprising an aqueous base fluid; and a nanofribril cellulose additive, wherein the nanofribril cellulose additive comprises nanofribril cellulose and a surfactant adsorbed onto a surface of the nanofribril cellulose; mixing equipment capable of mixing the treatment fluid; and pumping equipment capable of delivering the treatment fluid into a wellbore. The treatment fluid may be a cement composition, a spacer fluid, a drilling fluid, or a fracturing fluid. The treatment fluid may be a cement composition further comprising a hydraulic cement. The nanofribril cellulose may comprise nanofribril cellulose derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrical, and any combination thereof. The nanofribril cellulose may be an unmodified nanofribril cellulose that was treated with the surfactant. The nanofribril cellulose additive may be present in the treatment fluid in an amount of about 0.1% to about 10% by weight of the treatment fluid. The nanofribril cellulose may comprise individual nanofribrils with a diameter of about 100 nanometers or less and a length of about 3000 nanometers or greater. The surfactant may be a foaming surfactant selected from the group consisting of betaines, hydrolyzed keratin, amine oxides, cocoamidopropyl dimethylamine oxide, methyl ester sulfonates; alkyl or alkene amidobetaines, alpha-olefin sulfonates, quaternary surfactants, $C_8$ to $C_{22}$ alkylethoxylate sulfates, and combinations thereof. The surfactant may be a foaming surfactant comprising a mixture of an ethoxylated alcohol ether sulfate surfactant, an alkyl or alkene amidopropyl betaine surfactant, and an alkyl or alkene dimethylamine oxide surfactant.

Referring now to FIG. 1, preparation of a treatment fluid, such as, for example, a cement composition in accordance with example systems, methods and compositions, will now be described. FIG. 1 illustrates a system 2 for preparation of a cement composition and delivery to a wellbore. As shown, the cement composition may be mixed in mixing equipment 4, such as a jet mixer, re-circulating mixer, or a batch mixer, for example, and then pumped via pumping equipment 6 to the wellbore. In some systems, methods and compositions, the mixing equipment 4 and the pumping equipment 6 may be disposed on one or more cement trucks as will be apparent to those of ordinary skill in the art. In some systems, methods and compositions, a jet mixer may be used, for example, to continuously mix the NFC additive, with the water (and other cement components) as it is being pumped to the wellbore.

Figure 2A:
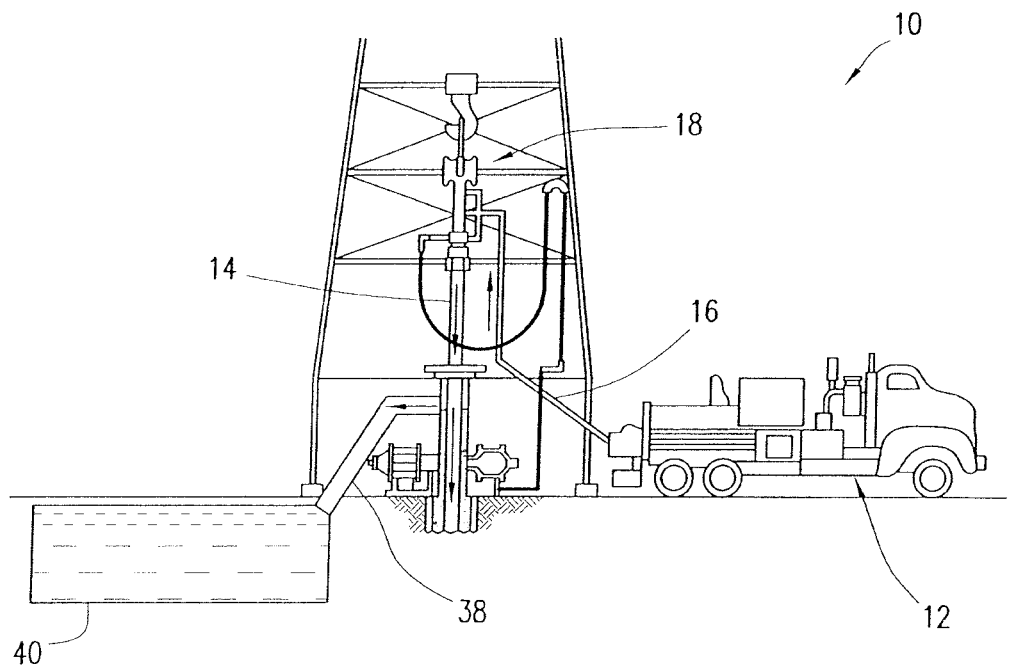
FIG. 2A is a schematic diagram that illustrates surface equipment that may be used in placement of a cement composition in a wellbore in accordance with certain examples.

An example technique for placing a cement composition into a subterranean formation will now be described with reference to FIGS. 2A and 2B. FIG. 2A illustrates surface equipment 10 that may be used in placement of a cement composition. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
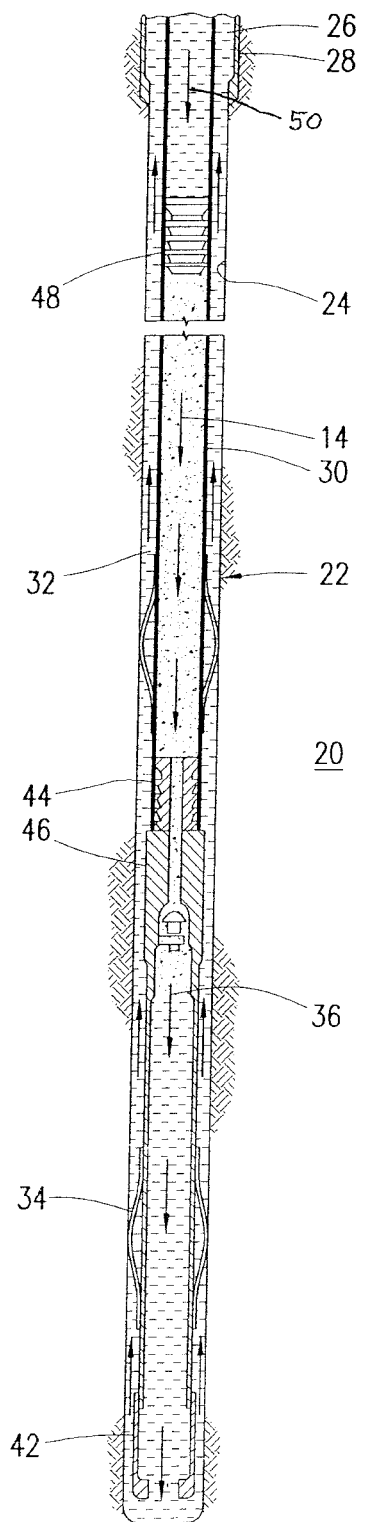
FIG. 2B is a schematic diagram that illustrates placement of a composition into a wellbore annulus in accordance with certain examples.

Turning now to FIG. 2B, the cement composition 14 may be placed into a subterranean formation 20. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustration, a surface casing 26 has been inserted into the wellbore 22. The surface casing 26 may be cemented to the walls 24 of the wellbore 22 by cement sheath 28. In the illustration, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustration, a top plug 48 may be introduced into the wellbore 22 behind the cement composition 14. The top plug 48 may separate the cement composition 14 from a displacement fluid 50 and also push the cement composition 14 through the bottom plug 44.

The NFC additives disclosed herein may directly or indirectly affect one or more components or pieces of equipment associated with the preparation, delivery, recapture, recycling, reuse, and/or disposal of the disclosed NFC additives. For example, the NFC additives may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary NFC additive or a treatment fluid containing the NFC additive. The NFC additives may also directly or indirectly affect any transport or delivery equipment used to convey the NFC additives to a well site or downhole such as, for example, any transport vessels, conduits, pipelines, trucks, tubulars, and/or pipes used to compositionally move the NFC additives from one location to another, any pumps, compressors, or motors (e.g., topside or downhole) used to drive the NFC additives (or treatment fluids containing the NFC additives) into motion, any valves or related joints used to regulate the pressure or flow rate of the NFC additives (or treatment fluids containing the NFC additives, and any sensors (i.e., pressure and temperature), gauges, and/or combinations thereof, and the like. The disclosed NFC additives may also directly or indirectly affect the various downhole equipment and tools that may come into contact with the NFC additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like While the preceding description is directed to use of the NFC additive in subterranean treatments, one of ordinary skill in the art, with the benefit of this disclosure, should understand that the NFC additive may be used in any of a variety of applications where an easily dispersible NFC additive may be desired. Without limitation, the NFC additive may be used in the construction, manufacturing, pharmaceuticals, and/or the food industry. By treatment with a surfactant described herein, the NFC may be provided in an NFC additive with may be readily transportable in a solid form.

To facilitate a better understanding of the present disclosure, the following example of certain aspects of some of the systems, methods and compositions are given. In no way should the following examples be read to limit, or define, the entire scope of the disclosure.

EXAMPLE 1

A mixture of 69.44 grams NFC (6% active in water), 5 grams ZONESEALANT™ 2000 L surfactant, 40 grams of deionized water, and a mixture (control) of 68 grams NFC (6%) and 40 grams of deionized water were placed in separate glass crystallization dishes and then placed in an oven at 200° F. for 24 hours. The resultant dried agglomerate from the NFC/ZONESEALANT™ 2000 L surfactant is referred to herein as Sample Additive 1. The resultant dried agglomerate from the NFC without any of the ZONESEALANT™ 2000 L surfactant is referred to herein as the Control Sample. 1.46 grams of Sample Additive 1 was placed in 38.24 grams of deionized water and sealed. 1.10 grams of the Control Sample was placed in a separate container with 37.44 grams of deionized water and sealed. Both containers were agitated by shaking over the course of 20 minutes. Sample Additive 1 that was dried in the presence of ZONESEALANT™ 2000 surfactant appears to dissolve to a greater extent than that of the Control Sample without any high shear or sonication. It was observed that Sample Additive 1 produced foam. However, the Control Sample without the ZONESEALANT™ 2000 surfactant did not produce foam. The produced foam from the NFC additive may show enhanced stability of the mixture, suggesting that some of the NFC may have dispersed in the mixture.

Next, a portion of Sample Additive 1 was chopped up and added to a container with deionized water. This container was agitated by shaking, over the course of several days, and the NFC became partially dispersed (NFC became partially hydrated). However, the stability of the produced foams did show an enhanced stability suggesting that some of the NFC may have dispersed in the mixture.

EXAMPLE 2

An additional sample, designated Sample Additive 2, was prepared by mixing NFC (6% active in water) with ZONESEALANT™ 2000 L surfactant, followed by drying at 200° F. for 24 hours. The ratio of the NFC to surfactant for Sample Additive 2 was 1:5 up from 1:1.2 for Sample Additive 1. After drying, 20 grams of Sample Additive 2 was placed in a container with 40 grams of deionized water. It was observed that the Sample Additive 2 completely dispersed in the deionized water with minimal mixing with a glass stir rod.

Next, the activity of the Sample Additive 2 was tested by comparing the foam stabilization ability of the NFC before and after the drying and dispersing process. Foam was produced using 196 grams of deionized water and 4 grams of Sample Additive 2. The foam was produced by placing the mixture in a sealed container and shaking. After 2 hours at room temperature, Sample Additive 2 appears to have stabilizing effects on the foam without any visible precipitation suggesting that the NFC may be properly dispersed.

Therefore, the present disclosure is well adapted to attain the ends and advantages mentioned as well as those that are inherent therein. The particular systems, methods and treatment fluid compositions disclosed above are illustrative only, as the present disclosure may be modified and practiced in different but equivalent manners apparent to those skilled in the art having the benefit of the teachings herein. Furthermore, no limitations are intended for the details of construction or design herein shown, other than as described in the claims below. It is therefore evident that the particular illustrative systems, methods and cement compositions disclosed above may be altered or modified and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method for well treatment comprising:
preparing a treatment fluid comprising:
an aqueous base fluid; and
a nanofibril cellulose additive, wherein the nanofibril cellulose additive comprises nanofibril cellulose and a surfactant adsorbed onto a surface of the nanofibril cellulose, wherein the nanofibril cellulose additive is a particulate with a size ranging from about 5 microns to about 1,500 microns; and
introducing the treatment fluid into a well bore penetrating a subterranean formation.

2. The method of claim 1, wherein the treatment fluid is a cement composition, a spacer fluid, a drilling fluid, or a fracturing fluid.

3. The method of claim 1, wherein the treatment fluid is a cement composition further comprising a hydraulic cement.

4. The method of claim 1, wherein the nanofibril cellulose comprises nanofibril cellulose derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrical, and any combination thereof.

5. The method of claim 1, wherein the nanofibril cellulose is an unmodified nanofibril cellulose that was treated with the surfactant.

6. The method of claim 1, wherein the nanofibril cellulose additive is present in the treatment fluid in an amount of about 0.1% to about 10% by weight of the treatment fluid.

7. The method of claim 1, wherein the nanofibril cellulose comprises individual nanofibrils with a diameter of about 100 nanometers or less and a length of about 3000 nanometers or greater.

8. The method of claim 1, wherein the surfactant is a foaming surfactant selected from the group consisting of betaines, hydrolyzed keratin, amine oxides, cocoamidopropyl dimethylamine oxide, methyl ester sulfonates; alkyl or alkene amidobetaines, alpha-olefin sulfonates, quaternary surfactants, C8 to C22 alkylethoxylate sulfates, and combinations thereof.

9. The method of claim 1, wherein the surfactant is a foaming surfactant comprising a mixture of an ethoxylated alcohol ether sulfate surfactant, an alkyl or alkene amidopropyl betaine surfactant, and an alkyl or alkene dimethylamine oxide surfactant.

10. The method of claim 1, further comprising foaming the treatment fluid with a gas, wherein the surfactant is a foaming surfactant.

11. The method of claim 1, wherein the nanofibril cellulose additive has a surface area of about 50 $m^2/g$ to about 70 $m^2/g$.

12. The method of claim 1, wherein the treatment fluid further comprises a cement, wherein the treatment fluid is foamed, and wherein the treatment fluid has a foam quality of about 18% to about 38%.

13. The method of claim 12, wherein the foam quality is calculated by the following:

$$\text{Foam quality} = \frac{\text{Total Foam Volume} - \text{Liquid Volume}}{\text{Total Foam Volume}}.$$

14. The method of claim 1, wherein the nanofibril cellulose additive and the aqueous base fluid are present in a weight ratio ranging of about 1:2 to about 1:100.

15. A method for well treatment comprising:
preparing a treatment fluid comprising:
an aqueous base fluid; and
a nanofibril cellulose additive, wherein the nanofibril cellulose additive comprises nanofibril cellulose and a surfactant adsorbed onto a surface of the nanofibril cellulose, wherein the nanofibril cellulose and the surfactant are present in a weight ratio ranging from about 1:5 to about 1:12, wherein the nanofibril cellulose additive is a particulate with a size ranging from about 5 microns to about 1,500 microns;
introducing the treatment fluid into a well bore penetrating a subterranean formation.

16. The method of claim 15, wherein the nanofibril cellulose additive has a surface area of about 50 $m^2/g$ to about 70 $m^2/g$.

17. The method of claim 15, wherein the treatment fluid further comprises a cement, wherein the treatment fluid is foamed, and wherein the treatment fluid has a foam quality of about 18% to about 38%.

* * * * *